(12) United States Patent
Li

(10) Patent No.: US 10,126,595 B2
(45) Date of Patent: Nov. 13, 2018

(54) TRANSFLECTIVE LIQUID CRYSTAL DISPLAY DEVICE AND MANUFACTURING METHOD THEREOF

(71) Applicant: BOE TECHNOLOGY GROUP CO., LTD., Beijing (CN)

(72) Inventor: Mingchao Li, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 196 days.

(21) Appl. No.: 14/361,036

(22) PCT Filed: Jun. 7, 2013

(86) PCT No.: PCT/CN2013/076958
§ 371 (c)(1),
(2) Date: May 28, 2014

(87) PCT Pub. No.: WO2014/153845
PCT Pub. Date: Oct. 2, 2014

(65) Prior Publication Data
US 2014/0333871 A1   Nov. 13, 2014

(30) Foreign Application Priority Data

Mar. 27, 2013   (CN) .......................... 2013 1 0101458

(51) Int. Cl.
*G02F 1/1335* (2006.01)
(52) U.S. Cl.
CPC .. *G02F 1/133605* (2013.01); *G02F 1/133555* (2013.01); *G02F 1/133611* (2013.01);
(Continued)
(58) Field of Classification Search
CPC ......... G02F 1/133605; G02F 1/133555; G02F 1/133611; G02F 1/133526;
(Continued)

(56) References Cited

U.S. PATENT DOCUMENTS 8,023,074 B2 * 9/2011 Watanabe ............ G02B 6/0053
349/106
8,199,282 B2 * 6/2012 Sugita ................. G02B 5/3058
349/113
(Continued)

FOREIGN PATENT DOCUMENTS

CN       1633618 A      6/2005
CN     101059612 A     10/2007
(Continued)

OTHER PUBLICATIONS

Definitions for "condense," "converge," and "lens" provided by Oxford Living Dictionaries at https://en.oxforddictionaries.com/definition/us and downloaded on Apr. 6, 2018.*
(Continued)

*Primary Examiner* — Angela Davison
(74) *Attorney, Agent, or Firm* — Collard & Roe, P.C.

(57) ABSTRACT

A transflective liquid crystal display device and a manufacturing method thereof are provided. The transflective liquid crystal display device comprises: a transflective liquid crystal display module (10) comprising a plurality of pixel units, and each pixel unit comprising a transmissive area and a reflective area; a backlight source (20) provided below the transflective liquid crystal display module (10); a condensing layer (30) provided at a face of the backlight source (20) facing the transflective liquid crystal display module (10) and comprising a plurality of condensing lenses (31) which correspond to the plurality of pixel units one by one so as to converge the internal light emitted from the backlight source (20) at the transmissive areas of corresponding pixel units; and a reflective layer (40) provided between the condensing layer (30) and the liquid crystal display module (10) and comprising meshes (41) passing the internal light converged by each said condensing lens (31).

19 Claims, 2 Drawing Sheets

(52) U.S. Cl.
CPC ............... *G02F 1/133526* (2013.01); *G02F 2001/133567* (2013.01); *G02F 2203/09* (2013.01)

(58) Field of Classification Search
CPC ......... G02F 1/133606; G02F 1/133553; G02F 2001/133567; G02F 2001/133607; G02F 2001/133557; G02F 2203/02; G02F 2203/09; G02F 2201/307; G02F 2201/34; G02F 203/09; G02B 5/18; G02B 5/1814; G02B 5/1819; G02B 5/08; G02B 3/005; G02B 3/006; G02B 6/0038; G02B 6/0036; G02B 6/0053; G09G 2300/0456
USPC ....... 349/114, 57, 95, 61, 68, 113; 362/97.1, 362/97.2
See application file for complete search history.

(56) References Cited

U.S. PATENT DOCUMENTS

| | | | | |
|---|---|---|---|---|
| 8,243,237 | B2* | 8/2012 | Grip | G02F 1/133555 349/114 |
| 8,390,773 | B2* | 3/2013 | Jeong | G02F 1/133371 349/114 |
| 2004/0233354 | A1 | 11/2004 | Uehara et al. | |
| 2007/0177079 | A1 | 8/2007 | Yoshikawa et al. | |
| 2009/0073570 | A1* | 3/2009 | Lubart | G02B 5/00 359/641 |
| 2012/0154713 | A1 | 6/2012 | Kwon | |

FOREIGN PATENT DOCUMENTS

| | | |
|---|---|---|
| CN | 101061424 A | 10/2007 |
| CN | 101165556 A | 4/2008 |
| CN | 102914905 A | 2/2013 |
| WO | 2011/025102 A1 | 3/2011 |

OTHER PUBLICATIONS

International Search Report, International Preliminary Report on Patentability and Written Opinion of the International Searching Authority of PCT/CN2013/076958. in Chinese, dated Jan. 2, 2014.
Chinese Office Action of Chinese Application No. 201310101458.1, dated Feb. 16, 2015 with English translation.
English Translation of the International Search Report of PCT/CN2013/076958 published in English dated Oct. 2, 2014.
English translation of the International Preliminary Report on Patentability and Written Opinion of the International Searching Authority of PCT/CN2013/076958, dated Sep. 29, 2015.

* cited by examiner

TRANSFLECTIVE LIQUID CRYSTAL DISPLAY DEVICE AND MANUFACTURING METHOD THEREOF

CROSS REFERENCE TO RELATED APPLICATIONS

This application is the National Stage of PCT/CN2013/076958 filed on Jun. 7, 2013, which claims priority under 35 U.S.C. § 119 of Chinese Application No. 201310101458.1 filed on Mar. 27, 2013, the disclosure of which is incorporated by reference.

TECHNICAL FIELD

Embodiments of the present invention relate to a transflective liquid crystal display device and a manufacturing method thereof.

BACKGROUND

A transflective liquid crystal display device has features of low power consumption and strong adaptability, and is widely used in mobile display devices such as mobile phone, flat computer and etc. Each pixel unit of the transflective display device has a reflective area and a transmissive area. In an environment of intensive light, the light irradiated to the reflective area from the outside serves as the light source of the reflective area so that the display area displays images; meanwhile, the transmissive area displays images through the light irradiated from a backlight source.

The defects of the prior art lie in that in an outdoor environment of intensive light irradiation, the brightness of the transmissive area and the reflective area of the transflective liquid crystal display device is not consistent, which results in poor display effect of the transflective liquid crystal display device.

SUMMARY

Embodiments of the present invention provide a transflective liquid crystal display device and a manufacturing method thereof, to improve the brightness uniformity of the transflective liquid crystal display device under intensive light irradiation and improve the display effect.

An embodiment of the present invention provides a transflective liquid crystal display device, comprising:

a transflective liquid crystal display module comprising a plurality of pixel units, and each pixel unit comprising a transmissive area and a reflective area;

a backlight source arranged to be opposed to a main surface of the transflective liquid crystal display module;

a condensing layer provided at a face of the backlight source facing the transflective liquid crystal display module and comprising a plurality of condensing lenses which correspond to the plurality of pixel units one by one so as to converge internal light emitted from the backlight source to the transmissive areas of corresponding pixel units; and a reflective layer provided between the condensing layer and the liquid crystal display module and comprising meshes through which the internal light converged by each of the condensing lens passes.

In an example, external light irradiated to the transmissive area of each pixel unit is reflected by the reflective layer to the transmissive area of an adjacent pixel unit.

In an example, each of the condensing lens has a center line coinciding with that of the transmissive area of a corresponding pixel unit.

In an example, the center line perpendicular to the reflective layer and passing through each of the meshes coincides with that of a corresponding condensing lens.

In an example, the condensing lens is a prism or convex lens.

In an example, the condensing layer is a transparent polymer optical film or glass layer.

In an example, the reflective layer is a metal reflective layer.

In an example, the transflective liquid crystal display module comprises:

a color filter substrate and an array substrate cell-assembled together;

a liquid crystal layer provided between the color filter substrate and the array substrate; and a reflective layer provided on a face of the array substrate facing the liquid crystal layer.

In an example, the transflective liquid crystal display module further comprises: an upper orientation layer provided on a face of the color filter substrate facing the liquid crystal layer and a lower orientation layer provided on a face of the array substrate facing the liquid crystal layer, and the lower orientation layer being above the reflective layer.

In an example, parts between each two meshes of the reflective layer corresponds to the reflective areas of the pixel units.

In an example, there is a predetermined distance between the reflective layer and the liquid crystal display module.

Another embodiment of the present invention provides a manufacturing method of the transflective liquid crystal display device, comprising following steps:

producing a condensing layer comprising a plurality of condensing lenses;

producing a reflective layer comprising meshes thereon corresponding to the condensing lenses one by one;

fixing the resultant condensing layer on a backlight source; and fixing the resultant reflective layer on the condensing layer, and making the meshes of the reflective layer correspond to the condensing lenses of the condensing layer one by one.

In an example, prior to producing the condensing layer, the method further comprises: determining a center to center spacing of the condensing lenses according to a center to center spacing between the pixel units in the transflective liquid crystal display module, so that the condensing lenses are centrosymmetric to the pixel units.

In an example, there is a predetermined distance between the reflective layer and the liquid crystal display module.

The embodiments of the present invention achieve following advantageous effects: by way of the condensing layer and the reflective layer, the light irradiated to the transmissive area of each pixel unit is fully used, the brightness of the transmissive area of each pixel unit in the transflective liquid crystal display device is improved, the difference between the light brightness of the transmissive area and the reflective area in the pixel unit is decreased, the brightness uniformity of the transflective liquid crystal display device under intensive light irradiation is enhanced, and the display effect is improved.

BRIEF DESCRIPTION OF THE DRAWINGS

In order to more clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical solutions and advantages of the embodiments of the invention more apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

To improve the brightness uniformity of the transflective liquid crystal display device under intensive light irradiation and improve the display effect, the embodiments of the present invention provide a transflective liquid crystal display device and a manufacturing method thereof. Through using the condensing layer to converge light emitted from the backlight source to the transmissive area of the pixel unit and through using the reflective layer to reflect the light irradiated to the transmissive area of the pixel unit to the transmissive area of an adjacent pixel unit, the light intensity at the transmissive area of the pixel unit is enhanced, and the display effect of the transflective liquid crystal display device under intensive light irradiation is improved. In order to make objects, technical solutions and advantages of the embodiments of the invention more apparent, the embodiments of the present invention will be further detailed hereinafter through embodiments.

Figure 1:
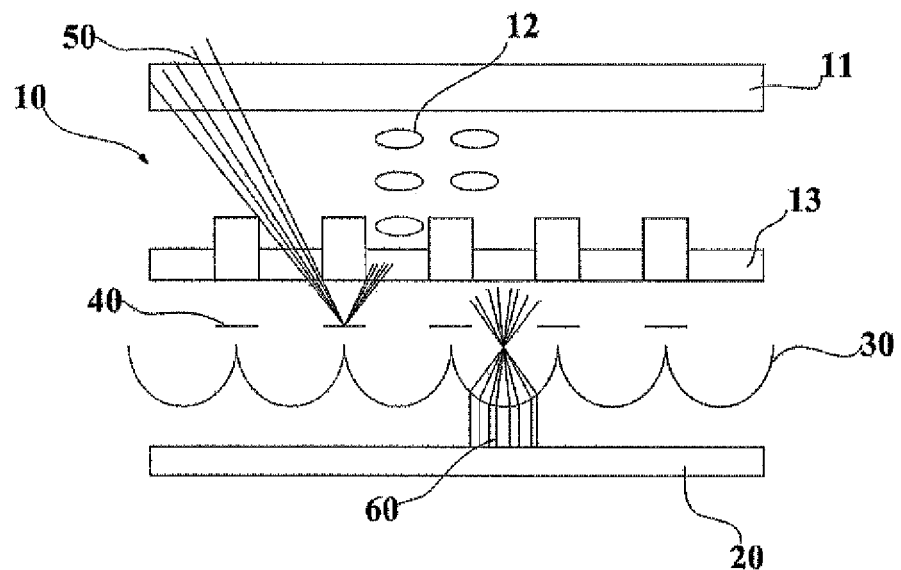
FIG. 1 is a schematic diagram of a cross section structure of a transflective liquid crystal display device provided by embodiments of the present invention.
Figure 2:
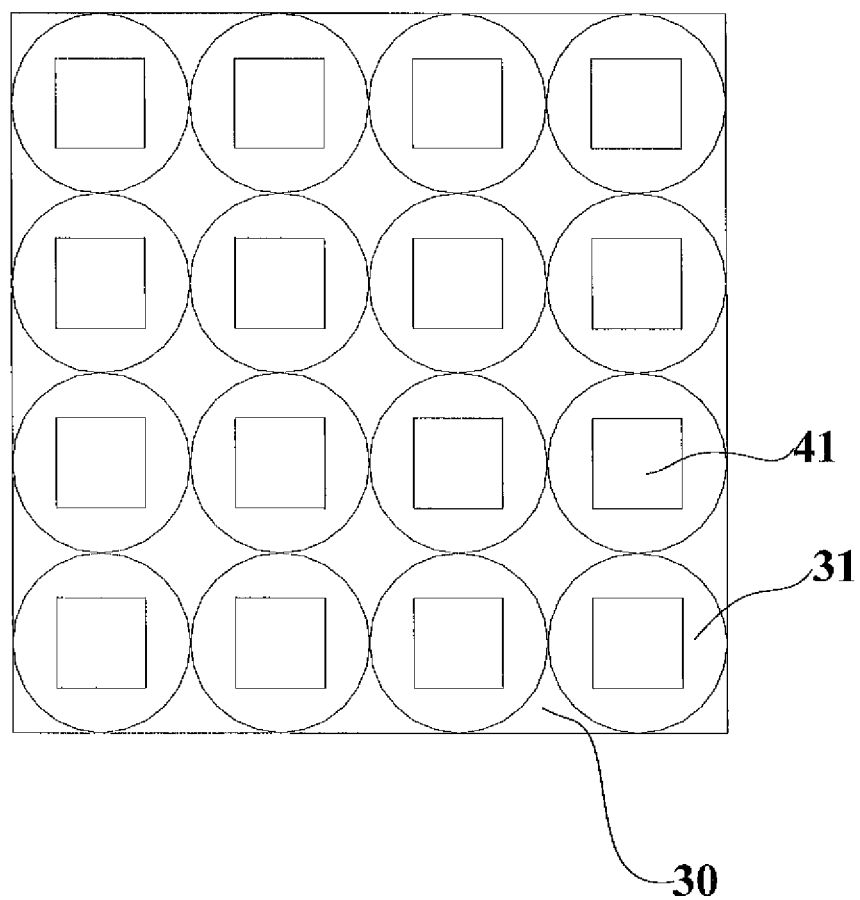
FIG. 2 is a top view of a condensing layer and a reflective layer.

As illustrated in FIGS. 1 and 2, FIG. 1 is a schematic diagram of a cross section structure of a transflective liquid crystal display device provided by an embodiment of the present invention; FIG. 2 is a top view of a condensing layer and a reflective layer; the direction in which the transflective liquid crystal display device is placed illustrated in FIG. 1 is used as a reference direction.

The transflective liquid crystal display device provided by the embodiment of the present invention comprises:

a transflective liquid crystal display module 10 comprising a plurality of pixel units, and each pixel unit comprising a transmissive area and a reflective area;

a backlight source 20 arranged below the transflective liquid crystal display module 10; for example, the backlight source is arranged to be opposed to a main surface of the transflective liquid crystal display module;

a condensing layer 30 provided at a face of the backlight source 20 facing the transflective liquid crystal display module 10 and comprising a plurality of condensing lenses 31 which correspond to the plurality of pixel units one by one so as to converge the internal light emitted from the backlight source 20 to the transmissive area of a corresponding pixel unit 30; and a reflective layer 40 which reflects external light irradiated to the transmissive area of each pixel unit to the transmissive area of an adjacent pixel unit, which is provided at the top face of the condensing layer 30 and comprising meshes 41 through which the internal light converged by each condensing lens 31 passes. That is, the reflective layer is provided between the condensing layer 30 and the liquid crystal display module 10.

To reflect the light transmitted from the transmissive area to the transmissive area of the adjacent pixel unit, for example, the part between each two meshes of the reflective layer corresponds to the reflective area of the pixel unit. In addition, there can be a predetermined distance between the reflective layer and the liquid crystal display module. The distance can be determined according to factors such as the size of the pixel unit.

The working principle of the transflective liquid crystal display device provided by the embodiment of the present invention is as follow:

The external light 50 is light from sunlight, lamplight or etc. which is irradiated to the pixel units from the outside of the transflective liquid crystal display device. When the external light 50 is irradiated to the transflective liquid crystal display module 10, the external light 50 irradiated to the reflective area of each pixel unit serves as light irradiating the pixel unit, and the external light 50 irradiated to the transmissive area of each pixel unit is reflected to the transmissive area of the adjacent pixel unit through the reflective layer 40 below the transflective liquid crystal display module 10, the brightness irradiated to the transmissive area of the pixel unit is improved, meanwhile, the internal light 60 emitted from the backlight source 20 is converged through the condensing layer 30 on the backlight source 20 and is irradiated to the transmissive area of each pixel unit through the meshes 41 on the reflective layer 40.

For the transflective liquid crystal display device provided by the embodiments of the present invention, the light irradiated to the transmissive area of each pixel unit has two sources, and one is the external light 50 reflected through the reflective layer 40 and the other is the converged internal light 60 which is emitted from the backlight source 20. By way of the reflective layer 40 and the condensing layer 30, the light brightness of the transmissive area of each pixel unit is enhanced, then the brightness difference between the transmissive area and the reflective area of each pixel unit is decreased, and the display effect of the transflective liquid crystal display device under intensive light is improved.

In the above embodiments, to converge more internal light 60 emitted from the backlight source 20 at the transmissive area of each pixel unit, for example, the center line (for example, the optical axis of the condensing lens) of each said condensing lens 31 coincides with that (for example, the center line passing the transmissive area in the direction perpendicular to the liquid crystal display module) of the transmissive area of a corresponding pixel unit, and the center of the condensing lens 31 corresponds to that of the transmissive area of the corresponding pixel unit, so that more internal light 60 converged by the condensing lens 31 can be irradiated to the transmissive area of the corresponding pixel unit.

Figure 3:
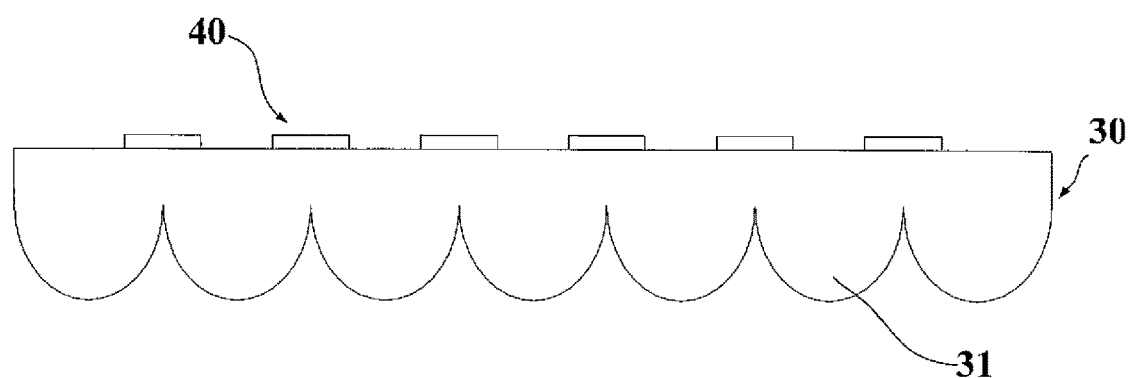
FIG. 3 is a left side view of the condensing layer and the reflective layer.

As illustrated in FIGS. 1 and 3, in the above embodiments, as the internal light 60 converged by the condensing lens 31 needs to pass through the meshes 41 on the reflective layer 40, to make more internal light 60 converged by the condensing lens 31 pass through the meshes 41 and then irradiate it to the transmissive area of the corresponding pixel unit, for example, the center line (the centre line passing through the mesh in the direction perpendicular to the reflective layer) of each said mesh 41 coincides with that of the corresponding condensing lens 31. In this case, the centers of the condensing lens 31, the mesh 41 and the transmissive area of the corresponding pixel unit correspond to each other one by one, thus it is ensured that the internal light 60 converged by the condensing lens 31 can be irradiated to the transmissive area of the corresponding pixel unit to the maximum extent. To further improve the effect, the distance between the focal point of the condensing lens 31 and the mesh 41 and the distance between the mesh 41 and the transmissive area of the corresponding pixel unit need to be determined according to different transflective liquid crystal display modules 10 during production.

In the above embodiments, the condensing layer 30 can be a condensing layer 30 of various materials, and a preferable one is a transparent polymer optical film or glass layer. The transparent polymer optical film can be a polyethylene film or a polypropylene film.

In the above embodiments, the condensing lens 31 can be selected from common condensing lenses 31 such as prism, double-faced convex lens, and single-faced convex lens.

In the above embodiments, the reflective layer 40 needs to have fine effect of reflecting the light, for example, the reflective layer 40 is a metal reflective layer 40. Using the metal reflective layer 40 can make the production of the reflective layer 40 convenient, and the meshes 41 of the metal reflective layer 40 can be obtained directly through punching, and can be produced through existing devices and processes, then the production cost of the reflective layer 40 is lowered.

In the above embodiment, the transflective display module 10 can be a transflective liquid crystal display module with a single cell thickness or a transflective liquid crystal display module with double cell thicknesses. The transflective liquid crystal display module 10 with double cell thicknesses comprises: a color filter substrate 11 and an array substrate 12 cell-assembled together; a liquid crystal layer 13 provided between the color filter substrate 11 and the array substrate 12; a reflective layer 40 provided on a face of the array substrate 12 facing the liquid crystal layer 13; and an upper orientation layer (not illustrated in the drawing) provided on a face of the color filter substrate 11 facing the liquid crystal layer 13 and a lower orientation layer (not illustrated in the drawing) provided on a face of the array substrate 12 facing the liquid crystal layer 13, and the lower orientation layer being above the reflective layer 40.

The manufacturing method of the transflective liquid crystal display device provided by the embodiments of the present invention comprises following steps:

producing a condensing layer comprising a plurality of condensing lenses;

producing a reflective layer comprising meshes thereon corresponding to the condensing lenses one by one;

fixing the resultant condensing layer on a backlight source; and fixing the resultant reflective layer on the condensing layer, and making the meshes of the reflective layer correspond to the condensing lenses of the condensing layer one by one.

The specific production steps of the transflective liquid crystal display device provided by the embodiments of the present invention are as follow:

1, producing the backlight source;

2, producing the transflective liquid crystal display module;

3, determining the center to center distance of the condensing lenses according to the center to center distance of the pixel units in the transflective liquid crystal display module so that the condensing lenses are centrosymmetric to the pixel units;

4, producing the condensing layer with an injection molding machine;

5, fixing the produced condensing layer on the backlight source;

6, producing the metal reflective layer with a punching machine, and punching meshes on the metal reflective layer corresponding to the condensing layer; and 7, fixing the produced metal reflective layer on the condensing layer in a way such that the meshes of the metal reflective layer correspond to the condensing lenses one by one.

The transflective liquid crystal display device produced with the above manufacturing method has fine display effect under intensive light.

Described above are just exemplary ones of the present invention, and are not intended to limit the scope of protection of the invention. The scope of protection of the present invention shall be defined by the appended claims.

The invention claimed is:

1. A transflective liquid crystal display device, comprising:
    a transflective liquid crystal display module comprising a plurality of pixel units, and each pixel unit comprising a transmissive area and a reflective area, wherein the transflective liquid crystal display module comprises: a first substrate and a second substrate, and a liquid crystal layer provided between the first substrate and the second substrate, wherein, the first substrate and the second substrate are configured to be assembled to form a liquid crystal cell;
    a backlight source arranged to be opposed to a main surface of the transflective liquid crystal display module;
    a condensing layer provided at a face of the backlight source facing the transflective liquid crystal display module and comprising a plurality of condensing lenses which correspond to the plurality of pixel units one by one so as to converge internal light emitted from the backlight source to the transmissive areas of corresponding pixel units; and
    a reflective layer provided between the condensing layer and the transflective liquid crystal display module and comprising meshes through which the internal light converged by each of the condensing lens passes, wherein the reflective layer is provided on a side of the second substrate facing the condensing layer,
    wherein, the second substrate is an array substrate,
    wherein, the reflective layer is in direct contact with the condensing layer,
    wherein, in a direction perpendicular to the transflective liquid crystal display module, focal points of the condensing lenses are located on a side of the reflective layer facing away from the transflective liquid crystal display module.

2. The transflective liquid crystal display device according to claim 1, wherein, external light irradiated to the transmissive area of each pixel unit is reflected by the reflective layer to the transmissive area of an adjacent pixel unit.

3. The transflective liquid crystal display device according to claim 2, wherein, each of the condensing lenses has a center line coinciding with that of the transmissive area of a corresponding pixel unit.

4. The transflective liquid crystal display device according to claim 2, wherein, the condensing lens is a prism or convex lens.

5. The transflective liquid crystal display device according to claim 2, wherein, the first substrate is a color filter substrate.

6. The transflective liquid crystal display device according to claim 2, wherein, parts of the reflective layer between each two meshes correspond to the reflective areas of the pixel units.

7. The transflective liquid crystal display device according to claim 2, wherein, there is a predetermined distance between the reflective layer and the transflective liquid crystal display module.

8. The transflective liquid crystal display device according to claim 1, wherein, each of the condensing lenses has a center line coinciding with that of the transmissive area of a corresponding pixel unit.

9. The transflective liquid crystal display device according to claim 8, wherein, the center line perpendicular to the reflective layer and passing through each of the meshes coincides with that of a corresponding condensing lens.

10. The transflective liquid crystal display device according to claim 1, wherein, the condensing lens is a prism or convex lens.

11. The transflective liquid crystal display device according to claim 10, wherein, the condensing layer is a transparent polymer optical film or glass layer.

12. The transflective liquid crystal display device according to claim 1, wherein, the reflective layer is a metal reflective layer.

13. The transflective liquid crystal display device according to claim 1, wherein, the first substrate is a color filter substrate.

14. The transflective liquid crystal display device according to claim 13, wherein, the transflective liquid crystal display module further comprises: an upper orientation layer provided on a face of the color filter substrate facing the liquid crystal layer and a lower orientation layer provided on a face of the array substrate facing the liquid crystal layer, and the lower orientation layer is above the reflective layer.

15. The transflective liquid crystal display device according to claim 1, wherein, parts of the reflective layer between each two meshes correspond to the reflective areas of the pixel units.

16. The transflective liquid crystal display device according to claim 1, wherein, there is a predetermined distance between the reflective layer and the transflective liquid crystal display module.

17. A manufacturing method of a transflective liquid crystal display device, comprising following steps:

producing a condensing layer comprising a plurality of condensing lenses;

producing a reflective layer comprising meshes thereon corresponding to the condensing lenses one by one;

fixing the resultant condensing layer on a backlight source; and fixing the resultant reflective layer on the condensing layer, and making the meshes of the reflective layer correspond to the condensing lenses of the condensing layer one by one, wherein, the transflective liquid crystal display device comprises a transflective liquid crystal display module comprising a plurality of pixel units, and each pixel unit comprising a transmissive area and a reflective area, the transflective liquid crystal display module comprises: a first substrate and a second substrate and a liquid crystal layer provided between the first substrate and the second substrate, wherein, the first substrate and the second substrate are configured to be assembled to form a liquid crystal cell, the second substrate is an array substrate, wherein the reflective layer is provided on a side of the second substrate facing the condensing layer, the reflective layer being in direct contact with the condensing layer, wherein, in a direction perpendicular to the transflective liquid crystal display module, focal points of the condensing lenses are located on a side of the reflective layer facing away from the transflective liquid crystal display module.

18. The manufacturing method of a transflective liquid crystal display device according to claim 17, prior to producing the condensing layer, further comprising: determining a center to center spacing of the condensing lenses according to a center to center spacing between the pixel units in the transflective liquid crystal display module, so that the condensing lenses are centrosymmetric to the pixel units.

19. The manufacturing method of a transflective liquid crystal display device according to claim 17, wherein, there is a predetermined distance between the reflective layer and the transflective liquid crystal display module.

* * * * *